United States Patent Office 3,573,982
Patented Apr. 6, 1971

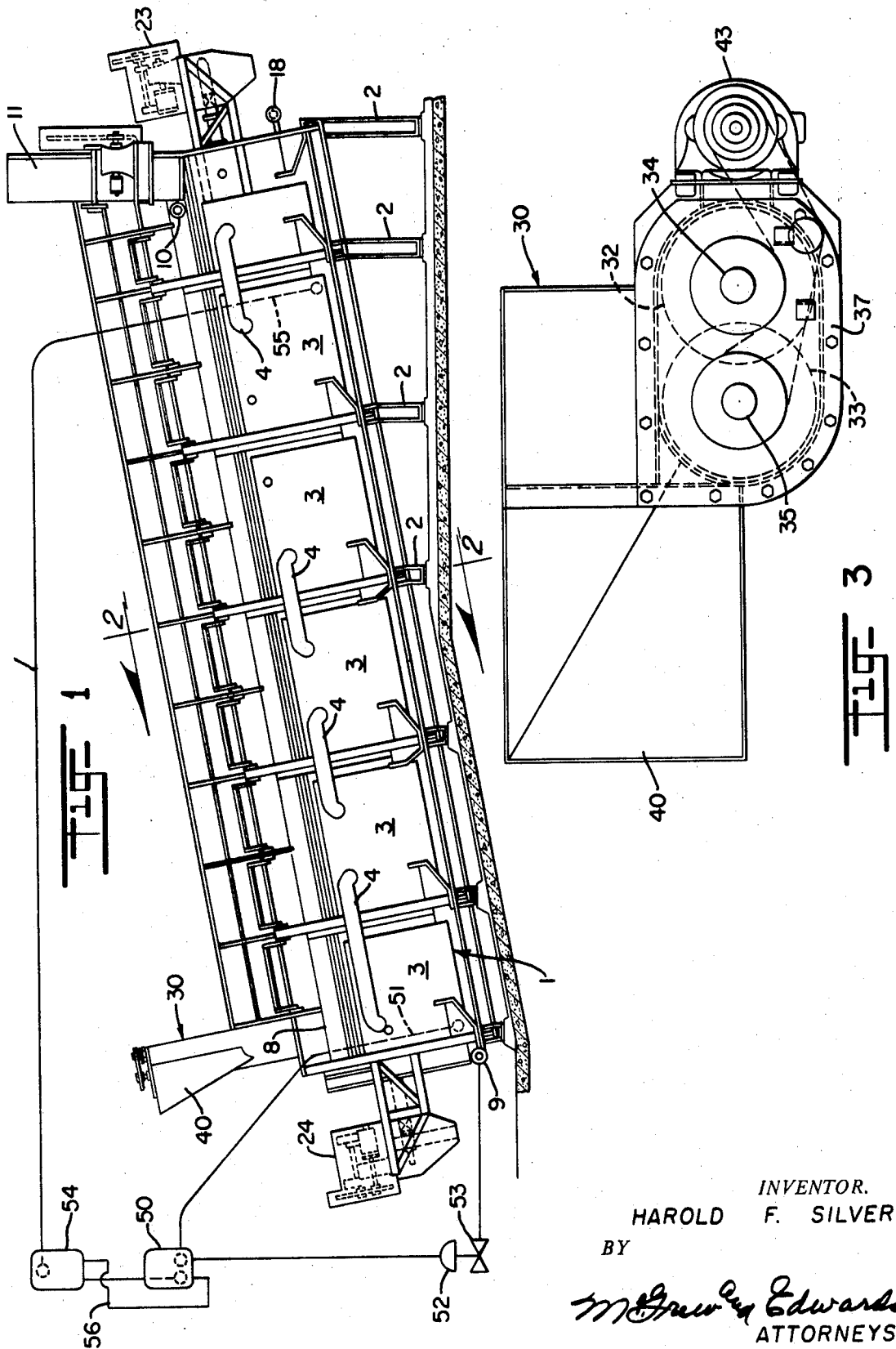

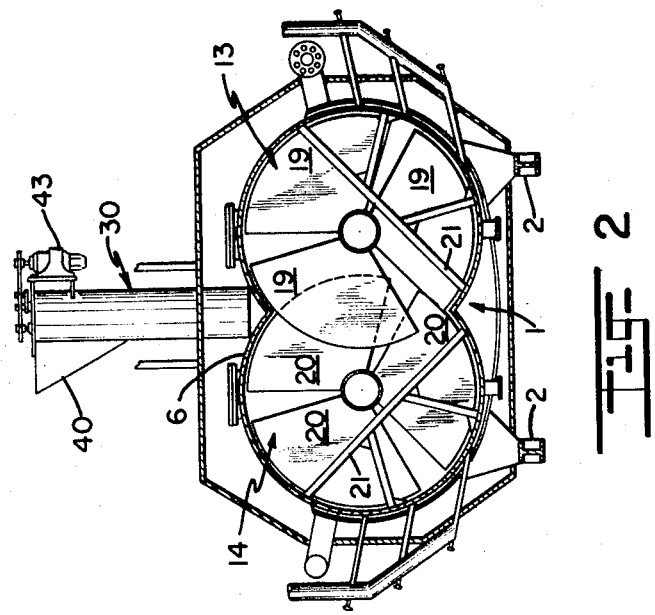
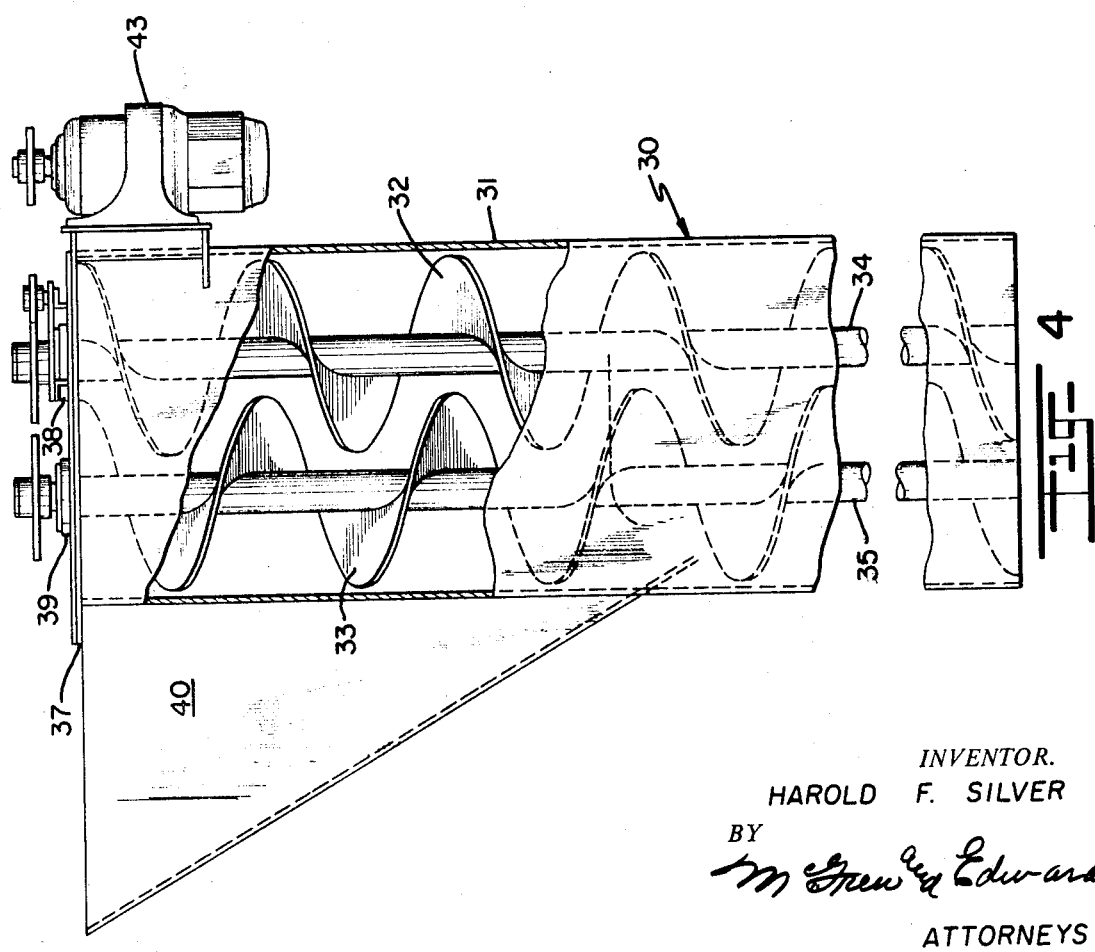

3,573,982
CONTINUOUS DIFFUSION APPARATUS AND PROCESS
Harold F. Silver, Denver, Colo., assignor to CF & I Engineers, Inc., Denver, Colo.
Continuation of application Ser. No. 490,526, Sept. 27, 1965. This application July 11, 1969, Ser. No. 845,672
Int. Cl. C13d 1/10, 1/12
U.S. Cl. 127—5                                    15 Claims

ABSTRACT OF THE DISCLOSURE

A continuous diffusion process and apparatus, comprising an elongated tank inclined to the horizontal and closed to the atmosphere in liquid-confining relation throughout its circumferential and lengthwise extent thereby establishing a treatment zone of substantial vertical extent in which newly introduced pulp is passed countercurrent to a flow of solution which becomes progressively enriched by contact with the pulp, said apparatus having a plurality of helical flight conveyors with lapping blades arranged to confine and impel the pulp with its solids content submerged throughout a progressive movement from the lower end to the upper end of the liquid-confining area and having means associated with a pulp feed inlet at its lower end for force feeding an entering pulp feed downwardly into and along a submerged course at the lower end of the tank between an end flight of one said conveyor and a next forward conveyor flight so as to maintain the submerged course within a flow of enriched solution passing to a discharge outlet at the lower end of the tank and thereby preventing emergence of pulp solids from associated solution during said movement.

---

This application is a continuation of applicant's earlier application Ser. No. 490,526, filed Sept. 27, 1965, for Continuous Diffusion Apparatus and Process and now abandoned and relates to a continuous diffusion process and apparatus and more particularly relates to improvements in the continuous diffusion apparatus and process disclosed in United States Patent No. 2,885,311.

Apparatus as disclosed in said patent includes a tank inclined at a slight angle to the horizontal having feed inlets and discharge outlets at its lower and upper ends providing solution flow countercurrent to cossette travel and having a plurality of specially constructed and arranged helical plate conveyors in the tank to move the cossettes in said countercurrent relation to the solution. There is a tendency for cossettes or other solids being subjected to continuous diffusion to remain on the surface of the liquid at the lower end of the tank until they become thoroughly wetted, which sometimes does not occur until they have advanced a substantial distance in the body of liquid. The structural arrangement of Pat. No. 2,885,311 does not provide any means for maintaining the solids completely submerged throughout their travel through the tank.

Accordingly, it is an object of this invention to provide improved apparatus for directing entering feed along a submerged course at the feed end.

It is a further object of this invention to provide improved apparatus for force-feeding the cossettes into the treatment zone below the solution surface level in a fully closed tank to maintain the cossettes in a submerged condition throughout their travel through the treatment zone.

Other objects reside in the novel features of construction and novel combinations and arrangements of parts, all of which will be set forth in detail in the course of the following description.

The practice of this invention will be understood by reference to the accompanying drawings in which several views having like parts have been designated similarly. In the drawings, FIG. 1 is a side elevation view of continuous diffusion apparatus embodying this invention shown in the normal operating position, and with a schematic showing of the flow control system;

FIG. 2 is a cross-sectional view taken along line 2—2 of FIG. 1 illustrating the arrangement of the dual helical flight conveyors and breaker bars confined within the tank and the feed assembly of the tank embodying features of my invention;

FIG. 3 is a top plan view of the feed assembly shown in FIG. 1 and drawn to an enlarged scale; and FIG. 4 is an end elevation view, partially in section, of the feed assembly shown in FIG. 3 illustrating the arrangement of the screw conveyors for directing the feed input.

Referring now to FIGS. 1 and 2 of the drawings, continuous diffusion apparatus embodying this invention includes a tank 1 inclined to the horizontal on a plurality of base supports 2. Steam jackets 3 and interconnecting pipes 4 are provided to heat the contents of the tank by steam, and other structure shown in FIG. 1 which is associated with the tank 1 has been described more fully in the above referred to patent.

A feed inlet 8 and a valve-controlled discharge outlet 9 are provided at the lower end of the tank for the introduction of pulp and withdrawal of enriched solution, respectively. A feed inlet 10 and discharge outlet 11 are provided in the upper end of the tank for the introduction of a liquid or solvent and withdrawal of spent pulp, respectively. The pulp is progressively moved upwardly from inlet 8 to the discharge outlet 11 by dual helical flight conveyors generally designated right conveyor 13 and left conveyor 14 as viewed in FIG. 2 rotated on central shafts 15 and 16, respectively.

Right conveyor 13 includes a flight of three helical sections 19 spaced around the periphery of shaft 15 with similar successive flights spaced lengthwise of shaft 15. Left conveyor 14 includes a flight of three helical sections 20 spaced around the periphery of shaft 16 with similar successive flights spaced lengthwise of shaft 16. Shafts 15 and 16 are disposed so that adjoining sets of flight sections intermesh in a lapping relation. Breaker bars 21 are positioned between successive flights to provide points of interruption to the angular pulp movement. Upper drive 23 and lower drive 24 are provided for rotating the helical flight conveyors 13 and 14 in opposite directions.

Tank 1 conforms in cross section to conveyors 13 and 14 as shown in FIG. 2 and is enclosed throughout its lengthwise and circumferential extent so as to provide a continuous confined treatment zone or liquid confining region closed to the atmosphere. A feeder assembly generally designated by numeral 30 is mounted in an upright position at the top of the lower end of tank 1 for force feeding pulp through the pulp feed inlet 8 between an end flight and adjoining flight of the conveyors 13 and 14 in a manner described more fully hereinafter.

Feeder assembly 30 is illustrated more fully in FIGS. 3 and 4 and comprises an elongated housing 31 enclosing a pair of screw-type conveyors 32 and 33 supported on rotary shafts 34 and 35. Shafts 34 and 35 are arranged in spaced parallel relationship with the helical portions intermeshing or overlapping. Housing 31 conforms in cross section to the exterior surfaces of the screw-type conveyors which are disposed therein in a generally closely-spaced relationship. A cover plate 37 extends over the sides of the housing and is removably secured to the housing to close the top thereof. Cover plate 37 supports bearing assemblies 38 and 39 for shafts 34 and 35, respectively. A feed hopper 40 extends outwardly from an intermediate portion of the housing 31 and terminates at the upper end of the housing. The lower end of the hopper 40 opens into the housing and passes incoming pulp therethrough. Conveyors 32 and 33 are rotated by a drive motor 43 secured to an upper side of the housing in a vertical mount arrangement and is suitably coupled to the shafts 34 and 35 in driving relationship by sheaves and belts or the like.

The condition and composition of the pulp being treated in diffusion apparatus of the type described herein is variable and will require different volumes of solution to be circulated in order to obtain optimum extraction during passage of the pulp through the apparatus. The drives 23 and 24 of the conveyors 13 and 14 preferably are the constant speed type but may be of the variable speed type so that they can increase or decrease the rate of travel of the pulp between its inlet and outlet and thus vary its retention time in treatment.

The provision of a complete enclosure of the tank 1 throughout its length is one of the innovations of the present invention. As shown in FIG. 2, a top covering section 6 of the tank walls is shaped to overhang the top surfaces of the conveyors 13 and 14 to and inclusive of the plane of their lapping relation and is disposed in close proximity to the top surfaces of the sections 19 and 20. The top of feed hopper 40 is at a higher elevation than any point within the tank enclosure at its elevated end and permits the tank to be completely filled when required. Thus, the pulp may be maintained completely submerged throughout its entire travel through the diffuser.

A control system is provided to regulate the amount of liquid fill in tank 1 and the rate of liquid flow through the pulp or cossettes. A controller 50 has an instrument measuring the level in the lower end of tank 1 as shown at 51 in FIG. 1 and a pneumatic regulator 52 controls a valve 53 in outlet passage 9 to maintain a predetermined or preset level of liquid within the diffuser. Another controller 54 has an instrument 55 measuring the liquid level at the upper end of the diffuser for controlling the level at the upper end by setting the control point of controller 50 through a connection 56. Controller 50 is constructed to have an upper limit which prevents a setting that will provide a liquid fill which would overflow through hopper 40. This control system operates so that any change in liquid flow through the pulp changes the control to reestablish a proper hydrostatic head in the tank.

The operation of the above described apparatus will now be explained with respect to beet sugar refining. Cossettes are fed into hopper 40 and are forcibly driven by conveyors 32 and 33 through the feed inlet downwardly and into and along a submerged course adjacent an end flight and an adjoined flight of the tank conveyors in enriched solution at the lower end of the tank 1. Controller 50 has been set to establish a desired solution level in tank 1. This force feeding forces the cossettes into the enriched solution wetting the cossettes and provides substantial initial contacting with the enriched solution therein. The cossettes are then moved progressively upwardly through the tank by the helical flight conveyors 13 and 14 in countercurrent relation to the liquid fed into the tank through inlet 10. Steam is delivered into and circulated through jackets 3 maintaining the desired temperature in the treatment zone. The inlets 8, 10 and outlets 9, 11 are regulated to maintain the liquid level to at least substantially fill the lower end of tank 1 and a more complete fill may be provided as required. The closed tank provides a circumferentially confined treatment zone closed to the atmosphere. Spent cossettes are discharged through the outlet 11 and enriched solution is withdrawn through outlet 9 at a rate determined by the setting of valve 53 as determined by controller 50.

The material fed into tank 1 by feed assembly 31 is forced downwardly and along a submerged course at the lower end of the tank terminating between an end flight and an adjoining flight of the conveyors 13 and 14. As the lower end of the tank is filled with liquid the material delivered between said flights is impelled upwardly along the inclined tank while submerged. The liquid at the lower end is enriched solution having a high sugar content and it takes in additional sugar from the cossettes it contacts and wets them in so doing. As the cossettes advance through the tank their sugar content diminishes and at each stage of the advance they encounter solution of lesser sugar content until as they near their discharge point the solution is water with little or no sugar content, and this provides a wash of the exterior surfaces of the cossettes as well as final extraction so that the cossette or spent pulp discharge contains little adhering or contained sugar.

Throughout the course of cossette movement, any portions thereof brought to the surface by the conveyor mechanism are confined by the overhanging tank surfaces and kept fully or substantially submerged in the solution.

Although there has been illustrated a specific embodiment of this invention, various modifications will occur to those skilled in the art. Therefore, this invention should not be limited to the specific structure illustrated and described but the appended claims cover all modifications which fall within the spirit and scope of this invention.

I claim:

1. A continuous diffusion apparatus comprising an elongated tank inclined to the horizontal and closed to the atmosphere so as to define a liquid-confining region throughout its circumferential and lengthwise extent, said tank having a pulp feed inlet for the introduction of pulp feed and a discharge outlet for the withdrawal of enriched solution at its lower end and having a liquid feed inlet for the introduction of solution and a discharge outlet for the withdrawal of spent pulp at its upper end for establishing a substantially complete fill of pulp during continuous operation of said diffusion apparatus, a plurality of helical flight conveyors in side-by-side relation with lapping blades within the tank arranged to confine and impel the introduced pulp with its solid content in a progressive submerged movement through solution introduced into the tank from said lower end to said upper end of the liquid-confining region of the tank, and means associated with the pulp feed inlet for force feeding an entering pulp feed downwardly through the pulp feed inlet into the liquid-confining region of the tank and along a submerged course at the lower end of the tank between an end flight of one said conveyor and a next forward conveyor flight so as to maintain the entering pulp in a submerged course within a flow of enriched solution passing to the discharge outlet at the lower end of the tank, thereby preventing emergence of pulp solids from associated solution during said progressive movement through the tank.

2. Apparatus as defined in claim 1, in which the means for force feeding pulp through the pulp feed inlet establishes sufficient pressure on the pulp to induce the downward flow of pulp into the flow of solution in said tank along said submerged course of movement through said solution countercurrent to said solution flow.

3. Apparatus as defined in claim 1, in which the means for force feeding pulp through the pulp feed inlet comprises mechanism including helical blade surfaces for impelling the pulp feed downwardly through said pulp feed inlet into said tank.

4. Apparatus as defined in claim 1, in which pulp solids are prevented from emerging on the surface of the submerged course by the action of the conveyor flights.

5. Apparatus as defined in claim 1, in which each conveyor has a plurality of segmental flights in circumferentially spaced arrangement.

6. Apparatus as defined in claim 1, in which a cover member encloses the upper surfaces of said conveyors in closely spaced and shape-conforming relation, 7. Apparatus as defined in claim 1, in which an enclosure at the lower end of the tank covers the upper surfaces of the conveyors and the force-fed pulp is delivered within said enclosure.

8. Apparatus as defined in claim 1, in which valve means control the solution discharge outlet and are operated to maintain a required fill within the tank enclosure.

9. Apparatus as defined in claim 1, in which valve means controlling the solution discharge outlet are actuated in accordance with the liquid fill in the tank.

10. Apparatus as defined in claim 1, in which valve means controlling the solution discharge outlet are actuated in accordance with the rate of flow of liquid through pulp in ascending movement through the tank.

11. A continuous diffusion apparatus comprising an elongated tank inclined to the horizontal and closed to the atmosphere so as to define a liquid-confining region throughout its circumferential and lengthwise extent, said tank having a pulp feed inlet for the introduction of pulp feed and a discharge outlet for the withdrawal of enriched solution at its lower end and having a liquid feed inlet for the introduction of solution and a discharge outlet for the withdrawal of spent pulp at its upper end for establishing a substantially complete fill of pulp during continuous operation of said diffusion apparatus, a plurality of helical flight conveyors in side-by-side relation with lapping blades within the tank arranged to confine and impel the introduced pulp with its solid content in a progressive submerged movement through solution introduced into the tank from said lower end to said upper end of the liquid-confining region of the tank, the walls of the tank defining said liquid-confining region being generally cylindrical and converging to establish a central zone in which the lapping portion of said blades are disposed, and means associated with the pulp feed inlet for force feeding an entering pulp feed downwardly through the pulp feed inlet into the liquid-confining region of the tank and along a submerged course at the lower end of the tank between an end flight of one said conveyor and a next forward conveyor flight so as to maintain the entering pulp in a submerged course within a flow of enriched solution passing to the discharge outlet at the lower end of the tank, thereby preventing emergence of pulp solids from associated solution during said progressive movement through the tank.

12. Apparatus as defined in claim 11, in which the cylindrical tank walls are concentric with the conveyor which they cover.

13. A continuous diffusion process which comprises the steps of:
establishing a flow of solution through a confined treatment zone which substantially fills said treatment zone by injecting the solution into a first end of said treatment zone and withdrawing the solution from a second end of said treatment zone;
force feeding pulp into the flow of said solution at the second end of said treatment zone with sufficient force to submerge the pulp in said solution;
moving the force fed pulp submerged in the solution through the solution in a submerged course countercurrent to the solution flow from the second to the first end of said treatment zone; and
withdrawing spent pulp at the first end of said treatment zone whereby a continuous diffusion process is established in which the solution withdrawn from the second end of said treatment zone is an enriched solution.

14. The process defined in claim 13, wherein the rate of moving the sumberged pulp through the solution is controlled whereby to provide a selective retention time in said treatment zone.

15. The process defined in claim 13, wherein the rates at which solution is introduced and withdrawn from said treatment zone are controlled so as to maintain a predetermined rate of flow of the solution through the submerged pulp being threated.

References Cited
UNITED STATES PATENTS

| | | | |
|---|---|---|---|
| 2,173,414 | 9/1939 | Fulton | 198—213 |
| 2,885,311 | 5/1959 | Brüniche-Olsen et al. | 127—45 |
| 3,195,446 | 7/1965 | French | 127—43X |
| 3,207,628 | 9/1965 | Rietz et al. | 127—43 |
| 3,226,202 | 12/1965 | Nagelvoort | 23—267 |
| 3,243,264 | 3/1966 | Hickey | 23—270 |

OTHER REFERENCES

Brüniche-Olsen, "The D.d.S-Diffuser for Cane" Sugar y Azucar, July 19, 1964, pp. 36–39 (1964).

JOSEPH SCOVRONEK, Primary Examiner

D. G. CONLIN, Assistant Examiner

U.S. Cl. X.R.

23—269, 270; 127—3, 7, 43, 45